US009042549B2

(12) United States Patent
Xiao et al.

(10) Patent No.: US 9,042,549 B2
(45) Date of Patent: May 26, 2015

(54) APPARATUS AND METHOD FOR ADDRESS PRIVACY PROTECTION IN RECEIVER ORIENTED CHANNELS

(75) Inventors: Lu Xiao, San Diego, CA (US); Yong Jin Kim, San Diego, CA (US); Zhanfeng Jia, Belmont, CA (US); David Jonathan Julian, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 715 days.

(21) Appl. No.: 12/414,630

(22) Filed: Mar. 30, 2009

(65) Prior Publication Data

US 2010/0246823 A1 Sep. 30, 2010

(51) Int. Cl.
| H04L 9/00 | (2006.01) |
| H04K 1/00 | (2006.01) |
| H04L 29/06 | (2006.01) |
| H04L 9/32 | (2006.01) |
| G06F 21/00 | (2013.01) |
| H04W 12/02 | (2009.01) |

(52) U.S. Cl.
CPC ........... *H04L 63/0421* (2013.01); *H04W 12/02* (2013.01)

(58) Field of Classification Search
USPC ............ 380/270, 262, 268, 44; 713/162, 168, 713/182
See application file for complete search history.

(56) References Cited

U.S. PATENT DOCUMENTS

| 6,381,629 | B1* | 4/2002 | Lee ................................ 709/201 |
| 2004/0025018 | A1* | 2/2004 | Haas et al. ..................... 713/168 |
| 2006/0136717 | A1* | 6/2006 | Buer et al. ..................... 713/155 |
| 2007/0293197 | A1 | 12/2007 | Ekberg et al. |
| 2008/0075083 | A1 | 3/2008 | Tremaine et al. |
| 2008/0224742 | A1* | 9/2008 | Pomichter ..................... 327/119 |
| 2009/0019530 | A1* | 1/2009 | Keeler et al. ...................... 726/4 |
| 2009/0327716 | A1* | 12/2009 | Raju et al. ..................... 713/168 |
| 2010/0211661 | A1* | 8/2010 | Morimoto et al. ............. 709/222 |
| 2010/0281257 | A1 | 11/2010 | Yamazaki et al. |

FOREIGN PATENT DOCUMENTS

| EP | 1871135 | 12/2007 |
| JP | 2002529779 A | 9/2002 |
| JP | 2004528735 A | 9/2004 |
| JP | 2008193667 A | 8/2008 |

(Continued)

OTHER PUBLICATIONS

D. Singelée, and B. Preneel, "Key Establishment Using Secure Distance Bounding Protocols," In First Workshop on the Security and Privacy of Emerging Ubiquitous Communication Systems, IEEE, 6 pages, 2007. http://www.cosic.esat.kuleuven.be/publications/article-954.pdf.

(Continued)

*Primary Examiner* — Aravind Moorthy
(74) *Attorney, Agent, or Firm* — Won Tae C. Kim

(57) ABSTRACT

Disclosed is a method for address privacy protection for a first wireless device sharing a privacy key with a second wireless device. In the method, a first resolution tag is generated at the first wireless device using a pseudo-random function with the seed value and the privacy key as input arguments. The privacy key is only known to the first and second wireless devices. A privacy address is generated for the first wireless device based on the seed value and the first resolution tag. A packet is transmitted from the first wireless device to the second wireless device. The packet includes the privacy address and the first resolution tag.

45 Claims, 4 Drawing Sheets

(56) References Cited

FOREIGN PATENT DOCUMENTS

| WO | WO0219599 | 3/2002 |
| WO | WO-2009011120 A1 | 1/2009 |

OTHER PUBLICATIONS

D. Singelée, and B. Preneel, "Enabling Location Privacy in Wireless Personal Area Networks." COSIC internal report. 19 pages, 2007. http://www.cosic.esat.kuleuven.be/publications/article-948.pdf.

International Search Report and Written Opinion—PCT/US2010/029121, International Search Authority—European Patent Office—Aug. 4, 2010.

Jakobsson M., et al., "Security weaknesses in Bluetooth," Opics in Cryptology—CT-RSA. The Cryptographers Track At Rsaconference, 2001, 176-191, XP002211423.

* cited by examiner

APPARATUS AND METHOD FOR ADDRESS PRIVACY PROTECTION IN RECEIVER ORIENTED CHANNELS

BACKGROUND

1. Field

The present invention relates generally to address privacy protection in receiver oriented wireless channels.

2. Background

Peer-to-peer networks that wirelessly transfer data over short distances are becoming prevalent due to advantages over traditional wired connections that use cables. Bluetooth and ZigBee are examples of standards for short range peer networks.

However, wireless communications between peer devices may be subject to tracking and attacks. A packet transmitted wirelessly over the air generally identifies its source and destination in order to be delivered correctly. The source and destination are generally identified by respective addresses. As a result, an eavesdropper may passively listen to a receive channel and track which source or destination address is involved. The eavesdropper thus knows that one entity is sending or receiving the packet.

In short range wireless communications, such possibility of address tracking is undesirable. The source or destination address in the packet usually is associated with a particular device. The presence of a device may disclose useful information such as location and time patterns of a device owner.

There is therefore a need for a technique for address privacy protection.

SUMMARY

An aspect of the invention may reside in a method for address privacy protection for a first wireless device sharing a privacy key with a second wireless device. In the method, a first resolution tag is generated at the first wireless device using a pseudo-random function with a seed value and the privacy key as input arguments. The privacy key is only known to the first and second wireless devices. A privacy address is generated for the first wireless device based on the seed value and the first resolution tag. A packet is transmitted from the first wireless device to the second wireless device. The packet includes the privacy address and the first resolution tag.

In more detailed aspects of the invention, the pseudo-random function may generate a truncated keyed hash message authentication code, or a cipher-based message authentication code. The privacy key may be a paired device key generated based on a pairing of the first and second wireless devices.

The packet may further include the seed value. The seed value may be a nonce. Alternatively, the seed value may be a time stamp, or a counter value maintained by the first and second wireless devices. Accordingly, the packet may include a portion of the seed value for synchronizing the seed value between the first and second wireless devices. The privacy address may be the seed value concatenated with the first resolution tag. The privacy address may just contain the first resolution tag, if the second device knows the seed value in other manners.

In other more detailed aspect of the invention, the second wireless device may receive the packet from the first wireless device over a wireless receive channel only associated with the second wireless device. The second wireless device may generate a second resolution tag using the pseudo-random function with the seed value and the privacy key as input arguments. The second wireless device may map the privacy address to the first wireless device when the second resolution tag matches the first resolution tag. Further, the first wireless device may transmit the packet to the second wireless device on a broadcast anonymous paging channel, and the second wireless device may forward a second packet to the first wireless device on a wireless receive channel defined by the privacy address of the first wireless device.

Another aspect of the invention may reside in an apparatus that has address privacy protection and that shares a privacy key with a second wireless device. The apparatus may include means for generating a first resolution tag using a pseudo-random function with a seed value and the privacy key as input arguments, wherein the privacy key is only known to the apparatus and the second wireless devices, means for generating a privacy address for the apparatus based on the seed value and the first resolution tag, and means for transmitting a packet to the second wireless device, wherein the packet includes the private address and the first resolution tag. The apparatus may comprise a watch, a headset, or a sensing device.

Another aspect of the invention may reside in a computer program product, comprising computer readable medium, comprising code for causing a computer to generate a first resolution tag using a pseudo-random function with a seed value and a privacy key as input arguments, wherein the privacy key is only known to the computer and a second wireless devices, code for causing a computer to generate a privacy address based on the seed value and the first resolution tag, and code for causing a computer to transient a packet to the second wireless device, wherein the packet includes the private address and the first resolution tag.

DETAILED DESCRIPTION

The word "exemplary" is used herein to mean "serving as an example, instance, or illustration." Any embodiment described herein as "exemplary" is not necessarily to be construed as preferred or advantageous over other embodiments.

Figure 1:
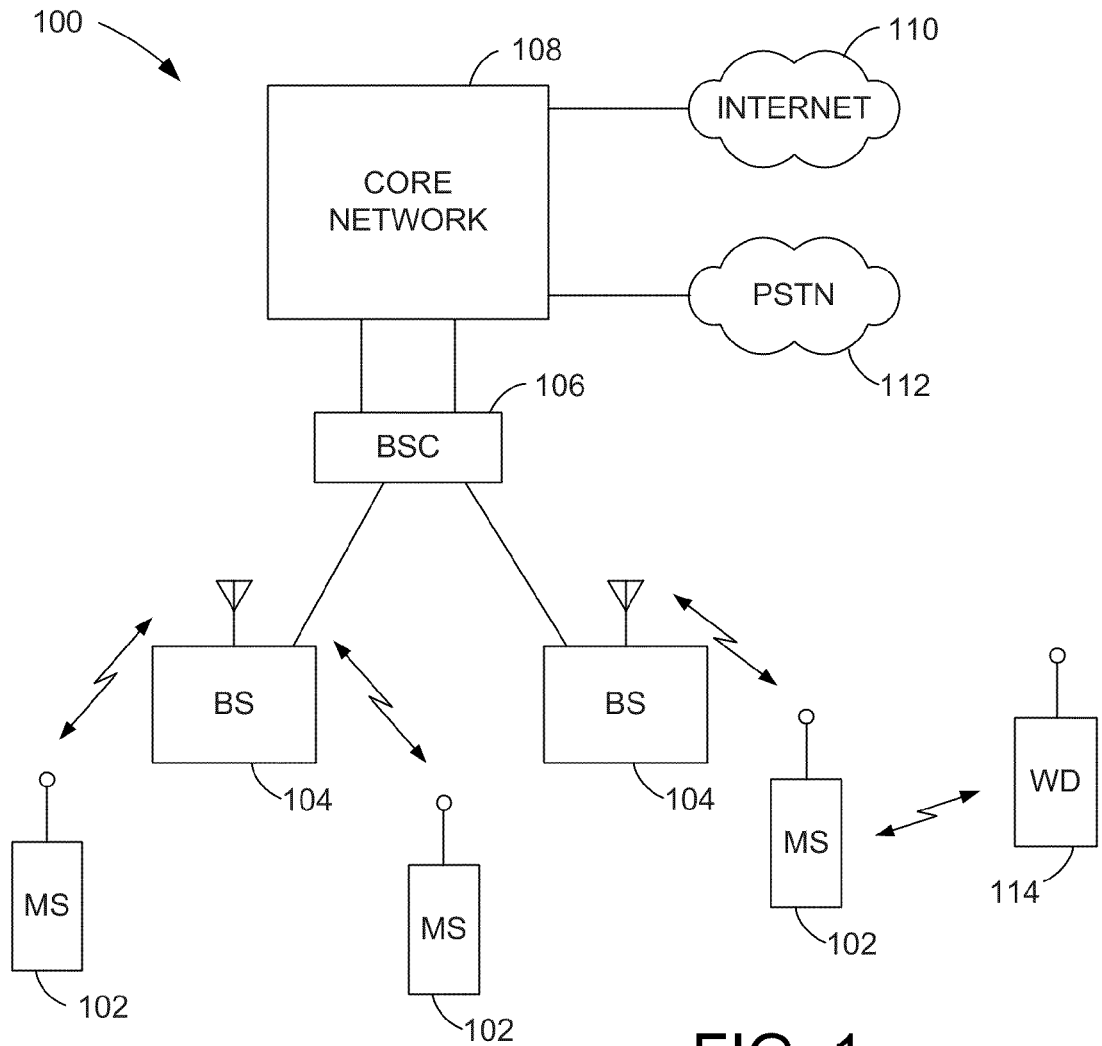
FIG. 1 is a block diagram of an example of a wireless communication system.
Figure 2:
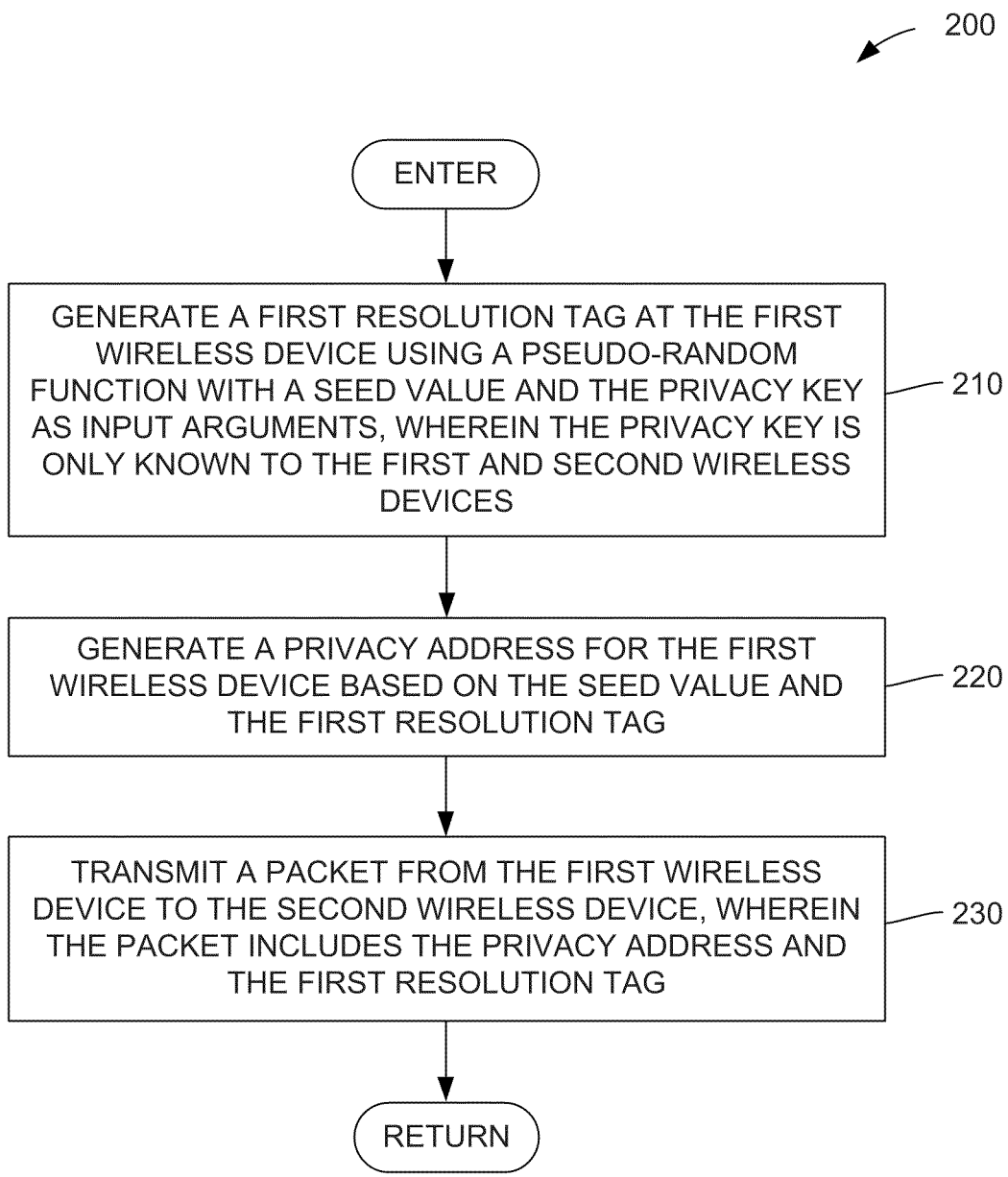
FIG. 2 is a flow diagram or a method for address privacy protection for a first wireless device sharing a privacy key with a second wireless device.
Figure 3:
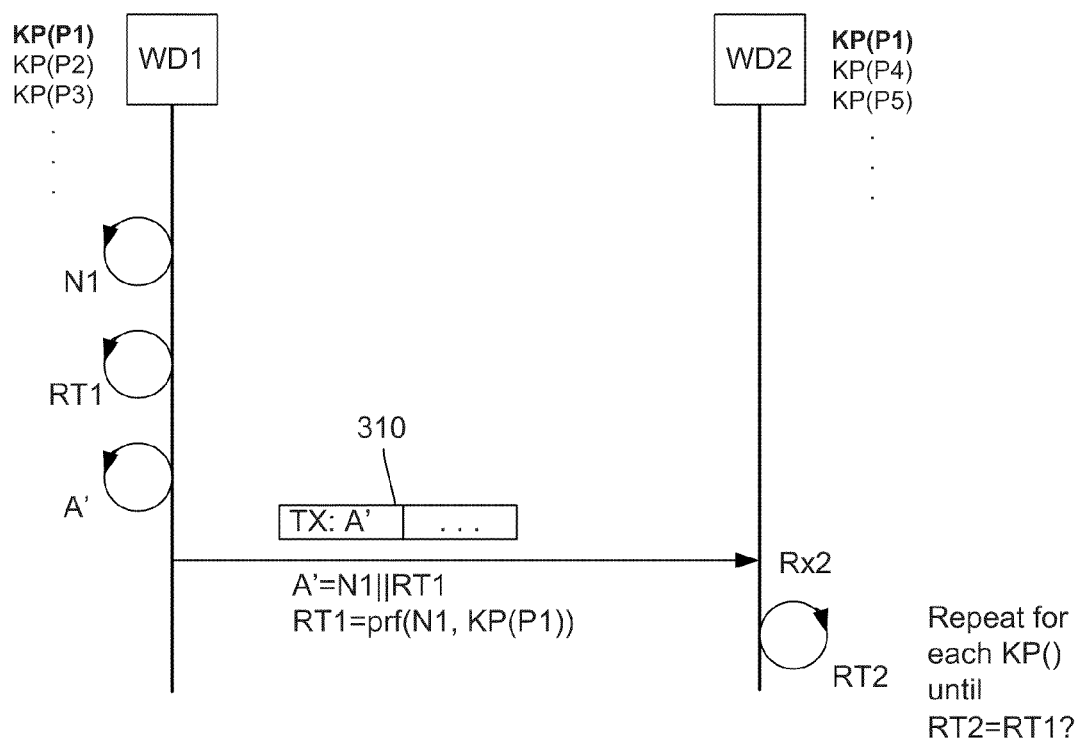
FIG. 3 is a flow diagram illustrating the method for address privacy protection.

With reference to FIGS. 1-3, an aspect of the invention may reside in a method 200 for address privacy protection for a first wireless device WD1, such as a mobile station 102, sharing a privacy key KP with a second wireless device, WD2 and 114. In the method, a first resolution tag RT1 is generated at the first wireless device using a pseudo-random function with a seed value S1 and the privacy key as input arguments (step 210). The privacy key is only known to the first and second wireless devices. A privacy address A' is generated for the first wireless device based on the seed value and the first resolution tag (step 220). A packet 310 is transmitted from the first wireless device to the second wireless device (step 230). The packet includes the privacy address and the first resolution tag.

The pseudo-random function may generate a truncated keyed hash message authentication code (HMAC), or a cipher-based message authentication code (CMAC). The pseudo-random function should be cryptographically strong so that it is infeasible to derive the shared privacy key KP from the privacy address A'. The privacy key may be a paired device key generated based on a pairing of the first and second wireless devices. To pair the devices, a user may manually enter a code into each device or establish security association between these two devices in other manners. The seed value S1 may be a nonce N1, a counter value, or a time stamp. The privacy address A' may be the seed value concatenated with the first resolution tag, such that A'=S1||RT1, where RT1=prf (S1, KP). When the seed value S1 is a counter value or time stamp, the seed value may be included, partially included, or omitted in the privacy address, depending on whether the recipient device is able to get its exact value in other methods. When the seed value is a nonce N1, the nonce is generated at the first wireless device WD1, as shown in FIG. 3, and transmitted in the packet 310 as part of the privacy address A'.

Further, the second wireless device WD2 may receive the packet from the first wireless device WD1 over a wireless receive channel Rx2 only associated with the second wireless device. The second wireless device may generate a second resolution tag RT2 using the pseudo-random function with the seed value (such as the nonce N1) and the privacy key as input arguments. The second wireless device may map the privacy address to the first wireless device when the second resolution tag matches the first resolution tag. The first and second wireless devices may be paired with a plurality of other devices. Each pair (P1, ..., PN) has an associated privacy key KP( ). The device maps the privacy address by generating the resolution tag for each privacy key KP(P1, ..., PN) until a match in the resolution tags is found.

Figure 4:
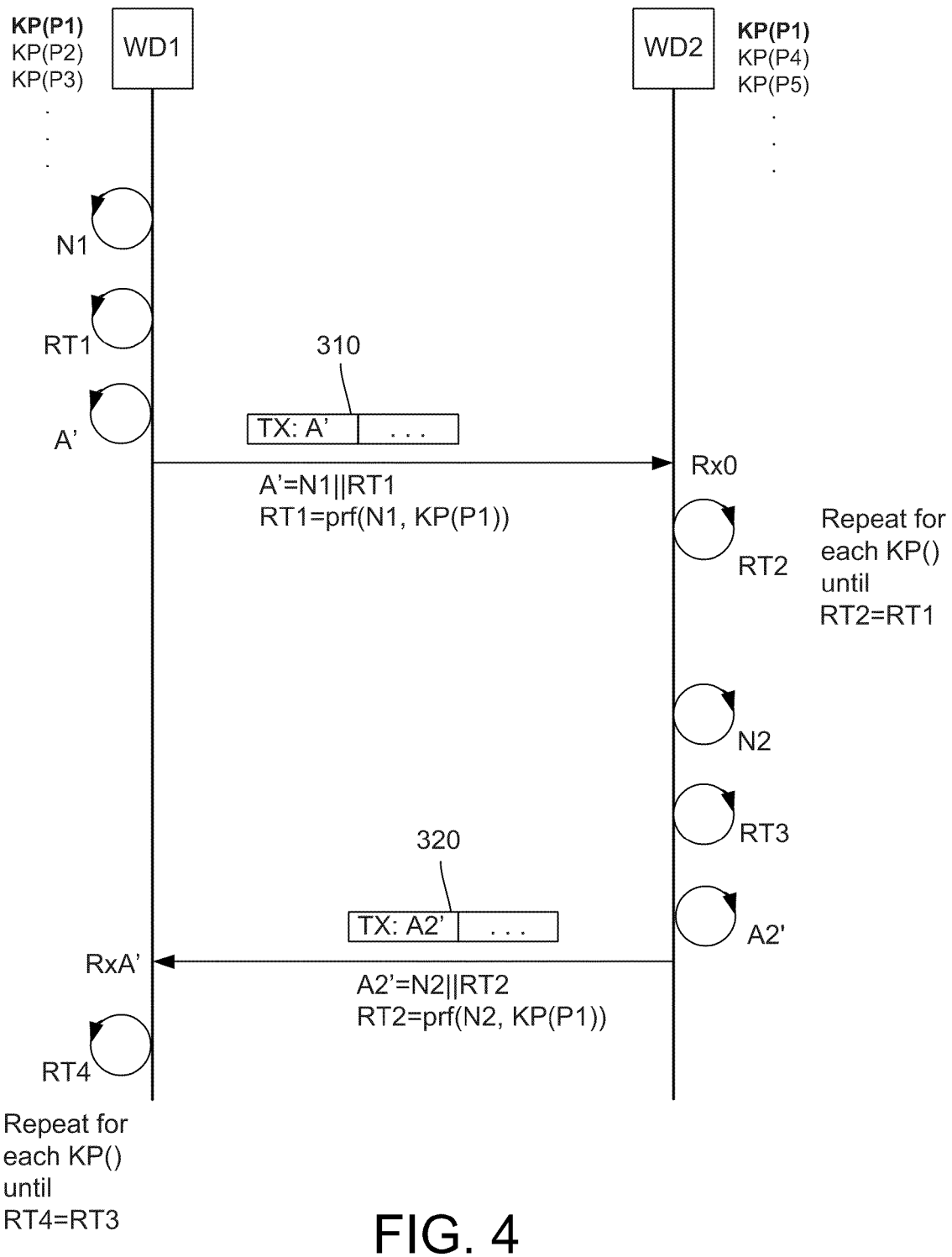
FIG. 4 is another flow diagram illustrating the method for address privacy protection.

With reference to FIG. 4, the first wireless device WD1 may transmit the packet 310 to the second wireless device on a broadcast anonymous paging channel Rx0, and the second wireless device WD2 may forward a second packet 320 to the first wireless device on a wireless receive channel RxA' defined by the privacy address A' of the first wireless device. Further, the second wireless device may generate a second seed value (such as nonce N2) for generating it own privacy address A2' based on the second nonce and a third resolution tag RT3 generated using the second nonce and the privacy key PK. The first wireless device may map the second privacy address A2' to the second wireless device by generating a fourth resolution tag RT4 and matching it to the third resolution tag RT3.

A wireless device should change its privacy address after a time period. Accordingly, the common receive channel associated with the device may change, e.g., from RxA' to RxA".

The present technique does not rely on a secret, such as an identity root (IR), that is shared by all devices paired with the device, such as in Bluetooth Low-Energy (LE). Instead, address privacy is protected in a pair-wise manner. Thus, even if one device paired with a device is compromised, an attacker cannot track activity with other devices except the one compromised.

Figure 5:
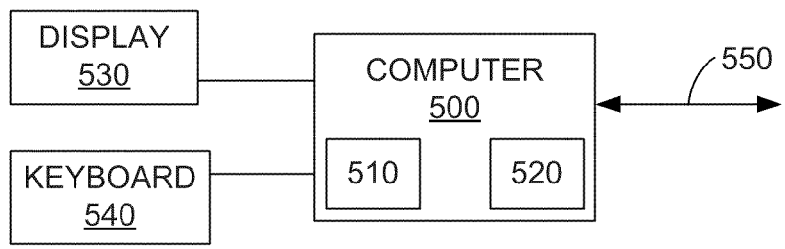
FIG. 5 is a block diagram of a computer including a processor and a memory.

With reference to FIG. 5, another aspect of the invention may reside in an apparatus 500 that has address privacy protection and that shares a privacy key KP with a second wireless device WD2. The apparatus may include means (processor 510) for generating a first resolution tag RT1 using a pseudo-random function with a seed value and the privacy key as input arguments, wherein the privacy key is only known to the apparatus and the second wireless devices, means for generating a privacy address A' for the apparatus based on the seed value and the first resolution tag, and means for transmitting a packet 310 to the second wireless device, wherein the packet includes the private address and the first resolution tag. The apparatus may comprise a watch, a headset, a sensing device, or a mobile station 102.

The apparatus may further include a storage medium 520 such as memory, a display 530, and an input device 540 such as a keyboard. The apparatus may include a wireless connection 550.

Another aspect of the invention may reside in a computer program product, comprising computer readable medium 520, comprising code for causing a computer 500 to generate a first resolution tag RT1 using a pseudo-random function with a seed value and a privacy key KP as input arguments, wherein the privacy key is only known to the computer and a second wireless devices, code for causing a computer to generate a privacy address A' based on the seed value and the first resolution tag, and code for causing a computer to transmit a packet 310 to the second wireless device, wherein the packet includes the private address and the first resolution tag.

A wireless device may include various components that perform functions based on signals that are transmitted by or received at the wireless device. For example, a wireless headset may include a transducer adapted to provide an audio output based on a signal received via the receiver. A wireless watch may include a user interface adapted to provide an indication based on a signal received via the receiver. A wireless sensing device may include a sensor adapted to provide data to be transmitted to another device.

With reference again to FIG. 1, a wireless mobile station (MS) 102 may communicate with one or more base stations (BS) 104 of a wireless communication system 100. The wireless communication system 100 may further include one or more base station controllers (BSC) 106, and a core network 108. Core network may be connected to an Internet 110 and a Public Switched Telephone Network (PSTN) 112 via suitable backhauls. A typical wireless mobile station may include a handheld phone, or a laptop computer. The wireless communication system 100 may employ any one of a number of multiple access techniques such as code division multiple access (CDMA), time division multiple access (TDMA), frequency division multiple access (FDMA), space division multiple access (SDMA), polarization division multiple access (PDMA), or other modulation techniques known in the art.

A wireless device 114 may communicate via one or more wireless communication links that are based on or otherwise support any suitable wireless communication technology. For example, in some aspects a wireless device may associate with a network. In some aspects the network may comprise a body area network or a personal area network (e.g., an ultra-wideband network). In some aspects the network may comprise a local area network or a wide area network. A wireless device may support or otherwise use one or more of a variety of wireless communication technologies, protocols, or standards such as, for example, CDMA, TDMA, OFDM, OFDMA, WiMAX, and Wi-Fi. Similarly, a wireless device may support or otherwise use one or more of a variety of corresponding modulation or multiplexing schemes. A wireless device may thus include appropriate components (e.g., air interfaces) to establish and communicate via one or more wireless communication links using the above or other wireless communication technologies. For example, a device may comprise a wireless transceiver with associated transmitter and receiver components (e.g., a transmitter and a receiver) that may include various components (e.g., signal generators and signal processors) that facilitate communication over a wireless medium.

The teachings herein may be incorporated into (e.g., implemented within or performed by) a variety of apparatuses (e.g., devices). For example, one or more aspects taught herein may be incorporated into a phone (e.g., a cellular phone), a personal data assistant ("PDA"), an entertainment device (e.g., a music or video device), a headset (e.g., headphones, an earpiece. etc.), a microphone, a medical device (e.g., a biometric sensor, a heart rate monitor, a pedometer, an EKG device, etc.), a user I/O device (e.g., a watch, a remote control, a light switch, a keyboard, a mouse, etc.), a tire pressure monitor, a computer, a point-of-sale device, an entertainment device, a hearing aid, a set-top box, or any other suitable device.

These devices may have different power and data requirements. In some aspects, the teachings herein may be adapted for use in low power applications (e.g., through the use of an impulse-based signaling scheme and low duty cycle modes) and may support a variety of data rates including relatively high data rates (e.g., through the use of high-bandwidth pulses).

In some aspects a wireless device may comprise an access device (e.g., a Wi-Fi access point) for a communication system. Such an access device may provide, for example, connectivity to another network (e.g., a wide area network such as the Internet or a cellular network) via a wired or wireless communication link. Accordingly, the access device may enable another device (e.g., a Wi-Fi station) to access the other network or some other functionality. In addition, it should be appreciated that one or both of the devices may be portable or, in some cases, relatively non-portable.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software as a computer program product, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way or example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for address privacy protection for a first wireless device sharing a privacy key with a second wireless device, comprising:
   generating a first resolution tag at the first wireless device using a pseudo-random function with a seed value and the privacy key as input arguments, wherein the privacy key is only known to the first and second wireless devices;
generating a privacy address for the first wireless device based on the seed value and the first resolution tag; and
transmitting a packet from the first wireless device to the second wireless device, wherein the packet includes the privacy address and the first resolution tag and does not include a particular device address for the first wireless device.

2. A method for address privacy protection as defined in claim 1, wherein the pseudo-random function generates a truncated keyed hash message authentication code.

3. A method for address privacy protection as defined in claim 1, wherein the pseudo-random function generates a cipher-based message authentication code.

4. A method for address privacy protection as defined in claim 1, wherein the privacy key is a paired device key generated based on a pairing of the first and second wireless devices.

5. A method for address privacy protection as defined in claim 1, wherein the packet further includes the seed value.

6. A method for address privacy protection as defined in claim 5, wherein the seed value is a nonce.

7. A method for address privacy protection as defined in claim 1, wherein the seed value is a counter value maintained by the first and second wireless devices.

8. A method for address privacy protection as defined in claim 1, wherein the seed value is a time stamp.

9. A method for address privacy protection as defined in claim 1, wherein the packet includes a portion of the seed value for synchronizing the seed value between the first and second wireless devices.

10. A method for address privacy protection as defined in claim 1, wherein the privacy address is the seed value concatenated with the first resolution tag.

11. A method for address privacy protection as defined in claim 1, further comprising:
the second wireless device receiving the packet from the first wireless device over a wireless receive channel only associated with the second wireless device;
the second wireless device generating a second resolution tag using the pseudo-random function with the seed value and the privacy key as input arguments; and
the second wireless device mapping the privacy address to the first wireless device when the second resolution tag matches the first resolution tag.

12. A method for address privacy protection as defined in claim 11, wherein:
the first wireless device transmits the packet to the second wireless device on a broadcast anonymous paging channel; and
the method further comprises the second wireless device forwarding a second packet to the first wireless device on a wireless receive channel defined by the privacy address of the first wireless device.

13. An apparatus with address privacy protection and that shares a privacy key with a second wireless device, comprising:
means for generating a first resolution tag using a pseudo-random function with a seed value and the privacy key as input arguments, wherein the privacy key is only known to the apparatus and the second wireless device;
means for generating a privacy address for the apparatus based on the seed value and the first resolution tag; and
means for transmitting a packet to the second wireless device, wherein the packet includes the privacy address and the first resolution tag and does not include a particular address for the apparatus.

14. An apparatus with address privacy protection as defined in claim 13, wherein the pseudo-random function generates a truncated keyed hash message authentication code.

15. An apparatus with address privacy protection as defined in claim 13, wherein the pseudo-random function generates a cipher-based message authentication code.

16. An apparatus with address privacy protection as defined in claim 13, wherein the privacy key is a paired device key generated based on a pairing of the apparatus and the second wireless device.

17. An apparatus with address privacy protection as defined in claim 13, wherein the packet further includes the seed value.

18. An apparatus with address privacy protection as defined in claim 17, wherein the seed value is a nonce.

19. An apparatus with address privacy protection as defined in claim 13, wherein the seed value is a counter value maintained by the apparatus and the second wireless device.

20. An apparatus with address privacy protection as defined in claim 13, wherein the seed value is a time stamp.

21. An apparatus with address privacy protection as defined in claim 13, wherein the packet includes a portion of the seed value for synchronizing the seed value between the apparatus and the second wireless device.

22. An apparatus with address privacy protection as defined in claim 13, wherein the privacy address is the seed value concatenated with the first resolution tag.

23. A computer program product, comprising:
computer-readable storage medium, comprising:
code for causing a computer to generate a first resolution tag using a pseudo-random function with a seed value and a privacy key as input arguments, wherein the privacy key is only known to the computer and a second wireless device;
code for causing a computer to generate a privacy address based on the seed value and the first resolution tag; and
code for causing a computer to transmit a packet to the second wireless device, wherein the packet includes the privacy address and the first resolution tag and does not include a particular address for the computer.

24. A computer program product as defined in claim 23, wherein the pseudo-random function generates a truncated keyed hash message authentication code.

25. A computer program product as defined in claim 23, wherein the pseudo-random function generates a cipher-based message authentication code.

26. A computer program product as defined in claim 23, wherein the privacy key is a paired device key generated based on a pairing of the computer and the second wireless device.

27. A computer program product as defined in claim 23, wherein the packet further includes the seed value.

28. A computer program product as defined in claim 27, wherein the seed value is a nonce.

29. A computer program product as defined in claim 23, wherein the seed value is a counter value maintained by the computer and the second wireless device.

30. A computer program product as defined in claim 23, wherein the seed value is a time stamp.

31. A computer program product as defined in claim 23, wherein the packet includes a portion of the seed value for synchronizing the seed value between the computer and second wireless device.

32. A computer program product as defined in claim 23, wherein the privacy address is the seed value concatenated with the first resolution tag.

33. A watch with address privacy protection and that shares a privacy key with a second wireless device, comprising:
- means for generating a first resolution tag using a pseudo-random function with a seed value and the privacy key as input arguments, wherein the privacy key is only known to the watch and the second wireless device;
- means for generating a privacy address for the watch based on the seed value and the first resolution tag; and
- means for transmitting a packet to the second wireless device, wherein the packet includes the privacy address and the first resolution tag and does not include a particular address for the watch.

34. A headset with address privacy protection and that shares a privacy key with a second wireless device, comprising:
- means for generating a first resolution tag using a pseudo-random function with a seed value and the privacy key as input arguments, wherein the privacy key is only known to the headset and the second wireless device;
- means for generating a privacy address for the headset based on the seed value and the first resolution tag; and
- means for transmitting a packet to the second wireless device, wherein the packet includes the privacy address and the first resolution tag and does not include a particular address for the headset.

35. A sensing device with address privacy protection and that shares a privacy key with a second wireless device, comprising:
- means for generating a first resolution tag using a pseudo-random function with a seed value and the privacy key as input arguments, wherein the privacy key is only known to the sensing and the second wireless device;
- means for generating a privacy address for the sensing device based on the seed value and the first resolution tag; and
- means for transmitting a packet to the second wireless device, wherein the packet includes the privacy address and the first resolution tag and does not include a particular device address for the sensing device.

36. An apparatus with address privacy protection and that shares a privacy key with a second wireless device, comprising:
- a processor configured to:
    - generate a first resolution tag using a pseudo-random function with a seed value and the privacy key as input arguments, wherein the privacy key is only known to the apparatus and the second wireless device;
    - generate a privacy address for the apparatus based on the seed value and the first resolution tag; and
    - transmit a packet to the second wireless device, wherein the packet includes the privacy address and the first resolution tag and does not include a particular address for the apparatus.

37. An apparatus with address privacy protection as defined in claim 36, wherein the pseudo-random function generates a truncated keyed hash message authentication code.

38. An apparatus with address privacy protection as defined in claim 36, wherein the pseudo-random function generates a cipher-based message authentication code.

39. An apparatus with address privacy protection as defined in claim 36, wherein the privacy key is a paired device key generated based on a pairing of the computer and the second wireless devices.

40. An apparatus with address privacy protection as defined in claim 36, wherein the packet further includes the seed value.

41. An apparatus with address privacy protection as defined in claim 40, wherein the seed value is a nonce.

42. An apparatus with address privacy protection as defined in claim 36, wherein the seed value is a counter value maintained by the apparatus and the second wireless device.

43. An apparatus with address privacy protection as defined in claim 36, wherein the seed value is a time stamp.

44. An apparatus with address privacy protection as defined in claim 36, wherein the packet includes a portion of the seed value for synchronizing the seed value between the apparatus and the second wireless device.

45. An apparatus with address privacy protection as defined in claim 36, wherein the privacy address is the seed value concatenated with the first resolution tag.

* * * * *